United States Patent [19]

Allan et al.

[11] 4,055,075
[45] Oct. 25, 1977

[54] METHOD AND APPARATUS FOR THE LEAK TESTING OF FILTERS

[75] Inventors: Thomas T. Allan, San Francisco; David E. Wilcox, Millbrae, both of Calif.

[73] Assignee: Flanders Filters, Inc., Washington, N.C.

[21] Appl. No.: 675,076

[22] Filed: Apr. 8, 1976

[51] Int. Cl.² .............................................. G01M 3/20
[52] U.S. Cl. ........................................ 73/40.7; 239/3; 324/33
[58] Field of Search ...................... 73/40, 40.7, 38, 28; 324/33, 71 R; 239/3, 15

[56] References Cited

U.S. PATENT DOCUMENTS

| | | | |
|---|---|---|---|
| 3,114,877 | 12/1963 | Dunham | 73/28 X |
| 3,178,930 | 4/1965 | Moore et al. | 73/28 |
| 3,296,491 | 1/1967 | Brown | 239/3 X |
| 3,392,573 | 7/1968 | Benson et al. | 73/38 |
| 3,573,460 | 4/1971 | Skala | 324/33 X |

Primary Examiner—Richard C. Queisser
Assistant Examiner—Joseph W. Roskos
Attorney, Agent, or Firm—Bell, Seltzer, Park & Gibson

[57] ABSTRACT

A method and apparatus for the leak testing of one or more filters, and comprising a housing adapted to sealably mount the filters, means for introducing DOP particles within the housing and immediately upstream of each of the filters, and means for imparting a like electrical charge to the particles such that the particles repel each other and rapidly disperse within the airstream so as to be substantially uniformly dispersed upon reaching the face of each filter. A collecting surface may be disposed downstream of the filters for detecting any of the charged particles to thereby permit a determination as to whether the filters are leaking. Alternatively, a collapsible panel system may be positioned immediately downstream of the filter to condense and impart turbulence to the airstream to thereby permit a sample to be withdrawn for analysis from a point closely adjacent the filter.

34 Claims, 11 Drawing Figures

METHOD AND APPARATUS FOR THE LEAK TESTING OF FILTERS

The present invention relates to a housing adapted to sealably mount one or more filters in an air duct system, and which has provision for the leak testing of the filters on a periodic basis. The housing has a minimum space requirement, and the test procedure is characterized by the individual testing of each filter within the housing.

In the manufacture of high efficiency air filtration systems, the filters, housings, and related components are usually initially tested as the final manufacturing step at the factory to locate any leaks and insure compliance with the desired efficiency rating. In addition, it is recognized that in-place testing of the completed installation is essential to insure leak tightness of the housing and filters in their assembled form. Also, in-place tests are usually conducted after each change of a filter in the system to insure proper installation of the new filter, as well as at regular intervals after installation to detect any deterioration of the gaskets or clamping devices, or the development of weld cracks or the like in the housing which result in leaks. Such periodic in-place testing is particularly important where harmful materials, such as potentially radioactive substances, dangerous viable organisms, or carcinogenic or toxic materials, are removed from the airstream by the filtration system.

Both factory and in-place efficiency testing of filters and filter installations conventionally utilizes either a monodispersed or a polydispersed aerosol of dioctyl phthalate (DOP) droplets or particles which have a light scattering mean diameter of 0.3 or 0.7 microns, respectively. The DOP is introduced into the airstream at a point in the duct far enough upstream of the filter or filter bank to assure complete dispersion by the time it reaches the filter or bank of filters. An upstream sampling device is usually provided immediately upstream of the filter to determine the concentration of the DOP in the duct, and a downstream sampling device is provided to detect leakage. More particularly, a portion of the airstream is withdrawn from the duct through the sampling devices and conveyed to an external photometric light-scattering instrument or the like which is designed to determine the DOP concentration in both the upstream and downstream samples.

In order to insure that the air-DOP mixture charged to the filters is thoroughly mixed to obtain a substantially uniform dispersion, and that the upstream sample is representative of the DOP concentration at that point, it has been recommended that the DOP be introduced at least ten duct diameters upstream of the filters, or introduced upstream of baffles or turning vanes in the duct. Also, the use of a Stairmand disk positioned three to five duct diameters upstream of the filters has been recommended for this purpose, see for example Chapter 7 of "Design, Construction, and Testing of High Efficiency Air Filtration Systems for Nuclear Applications" by Burchsted and Fuller, published January 1970 by Oak Ridge National Laboratory. Thus in order to properly introduce the DOP into the airstream utilizing these recommended procedures, extra equipment and a great deal of space is required.

It is also presently recommended that the downstream sampling port be located a considerable distance downstream of the filter, and preferably downstream of the exhaust fan, to insure that any DOP which leaks through the filter becomes sufficiently mixed with the filtered air so that the leak will be detected no matter where in the airstream the sample is withdrawn. This procedure not only serves to further increase the space requirements of the test apparatus, but also, it reduces the assurance that a leak will be detected by reason of the dilution effect of the leaking DOP in the great volume of filtered air. As will be apparent, this dilution effect is particularly pronounced where a large bank of filters is employed.

In installations requiring multiple banks of filters employed in series, the space requirements for introducing the DOP, and withdrawing the samples, are multiplied since the banks must be separated a distance sufficient to accomplish the above objectives. In an attempt to alleviate this problem, it has been proposed to employ temporary ducts between the various banks with suitable valves therein, and with the temporary ducts serving to selectively isolate each bank in the apparatus during the test procedure and introduce the DOP and withdraw the samples at an appropriate distance from each bank. However, this proposed system is not entirely satisfactory since it requires a great deal of extra equipment which is only used during the test procedure, and the use of temporary ducts adds additional problems of possible leakage through the various required connections and valves.

Where the above tests indicate the presence of an unacceptable leak, it is standard practice for a workman to physically enter the duct at the downstream side of the filter bank to conduct leak probing of individual filters, and thereby permit identification and replacement of the faulty filter. In some cases, it is also necessary for the workman to enter the upstream side to locate the source of the leakage problem. Such direct personnel access is often impractical and/or dangerous however, either because of the system configuration, or because of high radioactivity levels or the presence of other dangerous materials in the airstream. In such cases, it has been previously proposed that the housing incorporate remotely operated long-handled probes which are able to cover the entire downstream area of the filter bank, or alternatively, that the workman don protective clothing prior to entering the duct. As will be apparent, neither of these alternatives is satisfactory, since the design and fabrication of suitable remotely operated probes significantly adds to the cost of the housing, and the physical entry of a workman into the duct greatly increases the risk of contamination to himself as well as other workers.

A further disadvantage in the above conventional testing procedure is the fact that both the upstream and downstream air samples are conveyed outside of the duct for evaluation. Where harmful materials may be present in the airstream as noted above, the external measuring equipment thus may become contaminated, and the danger of leakage of such materials into the outside atmosphere is increased.

Still another problem associated with the above described conventional testing procedure for a bank of filters is the fact that a great deal of DOP must be fed into the airstream to assure an adequate dispersion in front of each filter. Since the area of the bank may be quite extensive, it is often difficult to achieve an even distribution of the DOP over the face of the entire bank, even when the DOP is introduced ten duct diameters upstream as recommended, and in addition, it is difficult to generate a sufficient quantity of the DOP for such large banks. Also, the DOP tends to become deposited on all of the filters while each individual filter in the system is being probed, thereby unduly loading the filters and increasing their resistance to the passage of the air.

It is accordingly an object of the present invention to provide a method and apparatus for leak testing one or more filters which are sealably mounted within a housing and wherein the DOP may be introduced and substantially uniformly dispersed into the duct at a location closely adjacent the upstream face of the filter, to thereby minimize the floor space and ductwork required for the test apparatus.

It is also an object of the present invention to provide a method and apparatus for leak testing a bank of filters or the like and wherein each filter is charged with the DOP and tested individually. Thus the identification of a leaking filter in the bank is readily apparent, and it is unnecessary to manually or mechanically probe the bank of filters for this purpose. Also, the amount of DOP required for the test and the build-up of the DOP on the filters is minimized, since each filter is subjected to the test medium only while it is being tested.

It is a further object of the present invention to provide a method and apparatus for leak testing of filters and wherein the downstream monitoring of the airstream may be conducted immediately downstream of the filters to further minimize the space requirements of the apparatus. Also, by so testing each individual filter in a bank of filters, the concentration of any leaking DOP is relatively high and therefore more readily detectable.

It is a further object of the present invention to provide a method and apparatus for leak testing a filter which is adapted either for use in testing a filter as part of the final manufacturing step at the factory, or the in-place testing of an installed filter or bank of filters. In this regard, substantially all components of the testing procedure may be permanently installed in the filter housing to thereby facilitate the periodic testing of a bank of filters installed in the housing.

These and other objects and advantages of the present invention are achieved in the embodiments of the invention illustrated and described herein by the provision of a housing which is adapted to form a part of an air duct system and have at least one filter sealably mounted therewithin. A DOP dispersion tube is mounted within the housing immediately upstream of the filter for introducing DOP particles into the airstream passing through the housing and filter, and an electrostatically charged ring is coaxially disposed about the tube for imparting a like electrical charge to the particles such that the particles repel each other upon entering the airstream. The resulting rapid and substantially uniform dispersion of the particles permits the dispersion tube to be located relatively close to the filter, which in turn serves to significantly reduce the space requirements of the housing as compared to the above noted prior art systems.

Where the housing mounts a bank of filters in parallel, one or more divider panels are mounted within the housing and upstream of the bank of filters for dividing the housing into a number of separate channels, with each channel defining an isolated portion of the airstream which passes through a single filter. A separate dispersion tube and ring is centrally mounted within each of these channels, and provision is made for selectively introducing the DOP particles into each of the several channels such that each filter may be individually tested.

In order to permit a determination as to whether any of the particles are leaking through or around the filters, an oppositely charged collecting plate may be positioned immediately downstream of each filter, and any current passing from the particles to the collecting plate is measured to thereby detect a leak. Similarly, the uniformity of the upstream concentration of the particles across the face of each filter may be determined by means of a plurality of relatively small collecting plates mounted immediately upstream of each filter so that the charge imparted to each plate by the DOP particles may be measured and compared. In such case, the entire testing procedure may be conducted from a remote location and without removing any portion of the airstream from the duct.

In an alternative embodiment, the downstream monitoring system includes a collapsible panel arrangement which is adapted to condense and impart turbulence to the airstream. A sampling tube is positioned centrally within the condensed airstream for withdrawing a sample of the airstream to permit external analysis in the conventional manner. This arrangement permits the sample to be withdrawn immediately downstream of the filter to further reduce the space requirements of the apparatus, and is useful in many instances as an alternative to the above described electrical detection system, or it may be used in association with the electrical system to permit a verification of results.

Some of the objects of the invention having been stated, other objects will appear as the description proceeds, when taken in connection with the accompanying drawings, in which.

Figure 1:
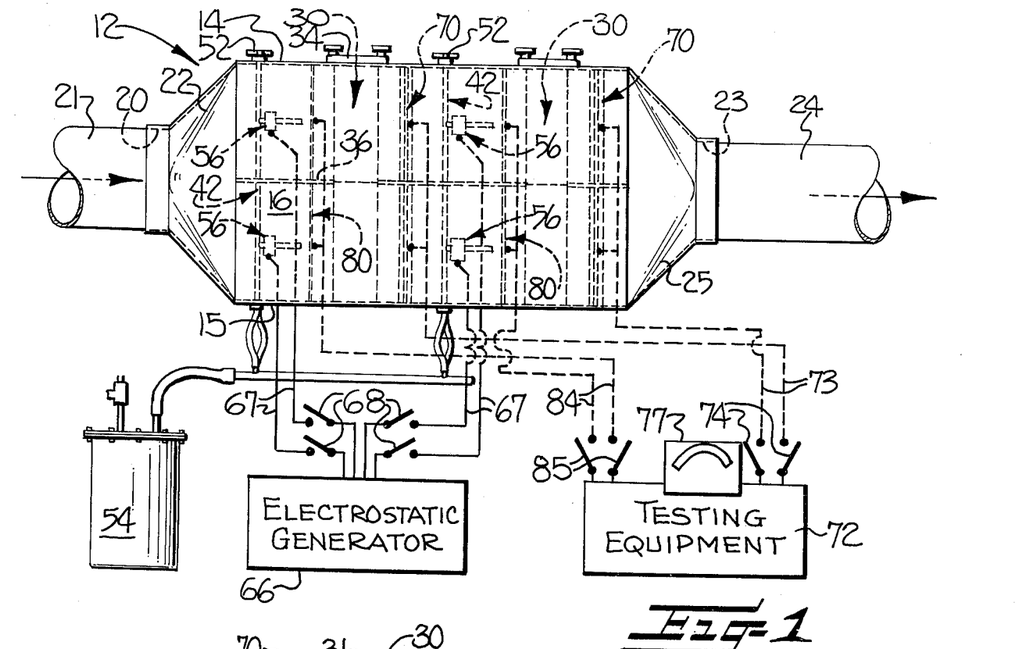
FIG. 1 is a schematic plan view of a filter test housing which embodies the features of the present invention.
Figure 2:
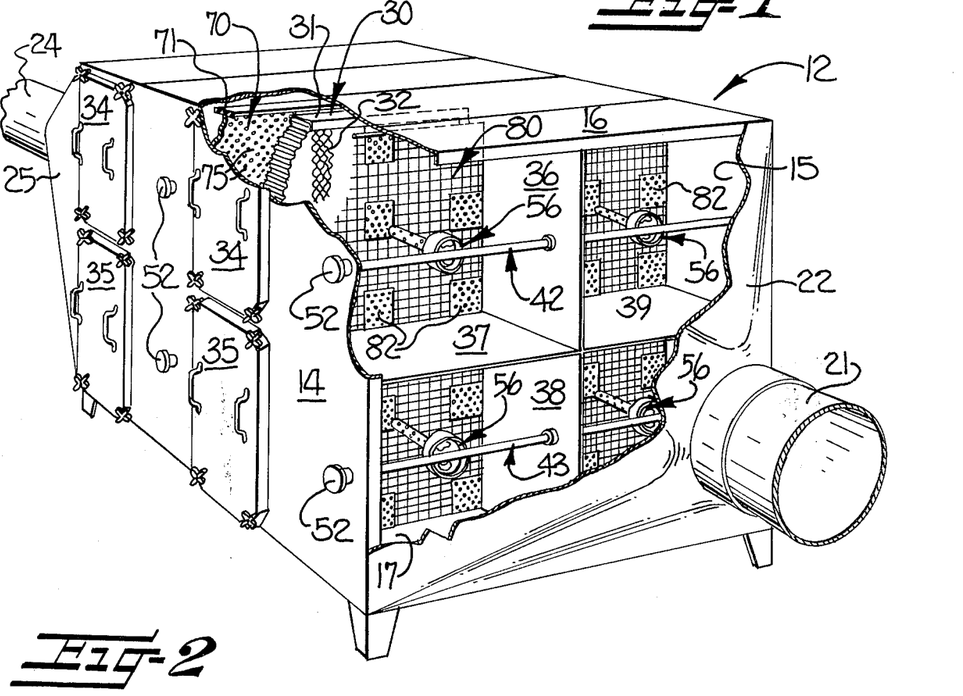
FIG. 2 is a perspective view, partly broken away, of the housing shown in FIG. 1.

Referring more specifically to the drawings, FIGS. 1 and 2 illustrate one embodiment of the present invention which includes a housing 12 which is adapted to form a part of an air duct system, such as an exhaust air cleaning system in a nuclear fuel manufacturing facility. More particularly, the housing 12 comprises a generally box-like enclosed structure having two side walls 14 and 15, a top wall 16, and a bottom wall 17. Also, the housing defines a forward open end 20 which is joined to an air inlet opening of the inlet duct 21 via the transition member 22, and a rear open end 23 which is similarly joined to the outlet duct 24 via the transition member 25. The housing is typically fabricated from a sheet metal material, such as 14 gauge stainless steel, and the housing is preferably electrically insulated from the ground for the reasons to become apparent.

In the illustrated embodiment, the housing 12 mounts two banks of filters in series, with each bank comprising four filters 30 in parallel. Typically, each filter 30 is about 24 × 24 × 12 inches in size, and comprises a wooden or chipboard frame 31 surrounding and supporting a pleated filtering media 32, such as a nonwoven fiberglass or cellulose-asbestos sheet material. Filters of this type may have extremely high dust retention characteristics, usually greater than about 95% efficiency, and typically 99.97% efficiency, as measured by the conventional DOP test, and are known as "absolute" or HEPA filters in the art.

The filters 30 of each bank are adapted to be inserted and removed from the housing 12 through the two associated side access doors 34, 35, with the two upper filters in each bank being inserted and removed through the upper door 34, and the two lower filters being inserted and removed through the lower door 35. As is well known in the art, means (not shown) are provided in the housing 12 for sealably mounting each of the filters therein. This sealing means may include a resilient gasket on the front peripheral face of the filter frame 31, or a fluid type seal such as described in the U.S. Pat. No. Re. 27,701 to Allan. Where a dangerous substance, such as radioactive material or viable organisms may be present on the filters or in the airstream, the housing may further include a conventional "bag-out" ring (not shown) about each of the access doors 34, 35 to permit the filters 30 to be enclosed in a plastic bag while being removed from the housing and thereby avoid possible contamination.

The portion of the housing 12 immediately upstream of each bank of filters is divided into four separate and rectangular air channels by means of the four perpendicularly disposed panels 36, 37, 38 and 39. Each channel is aligned with one of the filters, and generally conforms in cross-sectional outline and size to that of the associated filter. Thus for example, the panels 36 and 37 cooperate with the side wall 14 and top wall 16 to define a separate air channel upstream of the filter located in the upper left hand corner of the bank as seen in FIG. 2. By this arrangement, the airstream entering the housing from the transition member 22 is divided by the panels into four equal portions, with each portion being isolated from the other portions and directed to pass through a single filter. Where the housing mounts a number of banks of filters in series, the panels 36–39 may extend the entire distance between the banks as seen in FIG. 1 to thereby also isolate the downstream portions of the airstream for the reasons set forth below.

In accordance with the present invention, means are provided for selectively dispersing particles of predetermined size (typically DOP particles having a mean diameter of between about 0.3 to 0.7 microns) in the portion of the airstream passing through each one of the channels. As illustrated in the embodiment of FIGS. 1–7, this dispersion means includes a pair of double walled supply pipes 42, 43 extending horizontally through the housing 12 upstream of each bank of filters, with the upper pipe 42 extending transversely through the upper two channels and the lower pipe 43 extending transversely through the lower two channels.

Each supply pipe 42, 43 includes an outer tubular member 45 which extends completely through the housing and is fixedly and sealably mounted in the side walls thereof, and a coaxial inner tubular valve member 46 which is rotatably carried within the outer member 45. The outer member 45 includes a pair of axially spaced openings 48a, 49a, with each such opening being centrally disposed in one of the air channels and facing the associated filter. The inner valve member 46 includes a pair of non-aligned and axially spaced openings 48b and 49b which generally conform to the openings 48a and 49a respectively. The remote end of the member 46 is open, and a dial 52 is carried at the near end thereof as seen in FIG. 2, the dial being positioned on the outside of the housing for ready access by the workmen. The remote end of the outer member includes a nipple 53 for connection to a conventional DOP generator 54.

Figures 3, 4:
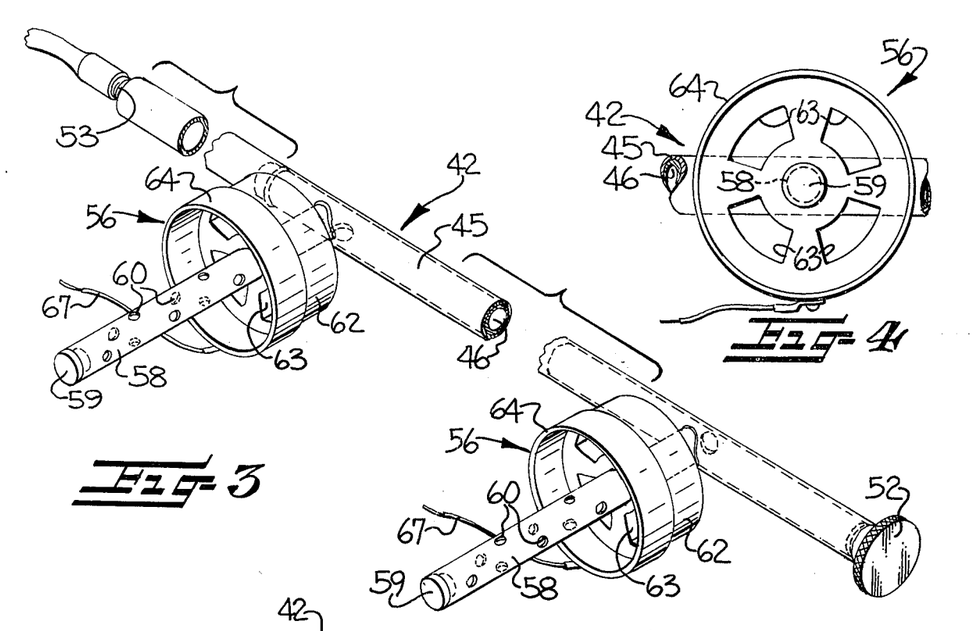
FIG. 3 is a fragmentary perspective view of a pair of dispersion assemblies and supporting supply pipe as utilized in the housing of FIG. 1.
FIG. 4 is a front elevation view of one of the dispersion assemblies shown in FIG. 3.
Figure 5:
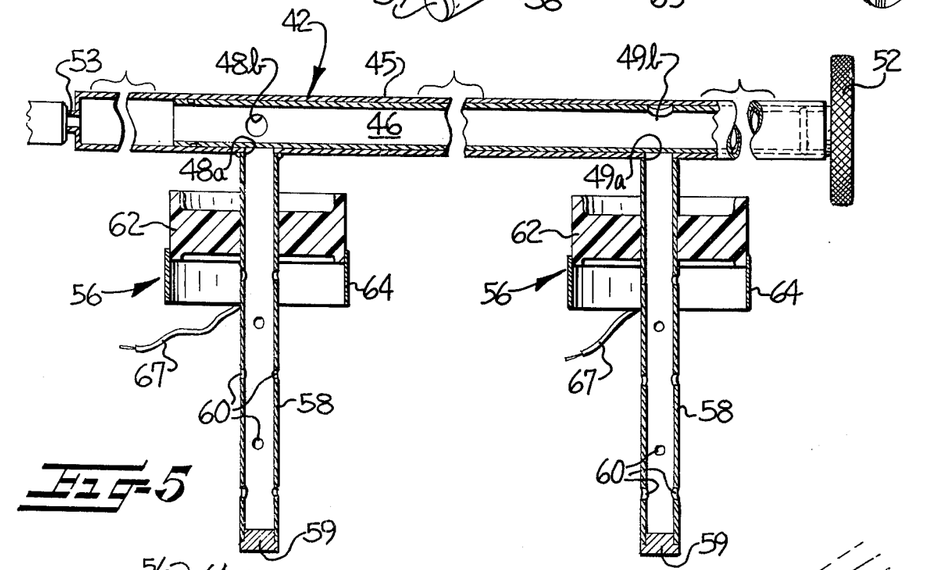
FIG. 5 is a sectional plan view of the dispersion assemblies and supporting supply pipe as shown in FIG. 3.

A pair of dispersion assemblies 56 are fixedly carried by each of the supply pipes 42, 43, such that a dispersion assembly is centrally positioned within each of the air channels. More particularly, each dispersion assembly 56 comprises an elongate outlet nozzle or dispersion tube 58 which is disposed in a direction substantially parallel to the direction of airflow through the housing, i.e., substantially perpendicular to the front face of the associated filter 30. The downstream end of the tubular member is closed by means of a cap 59, and a plurality of openings 60 extend radially through the wall thereof. As best seen in FIGS. 3 and 5, these radial openings are spaced along the length of the dispersion tube and extend in a plurality of radial directions so as to achieve a substantially uniform dispersion pattern as hereinafter further described. Also, the tube 58 is disposed on the outer member 45 of the supply pipe such that the upstream end of the tube 58 communicates with the associated opening 48a or 49a in the outer member.

By the above arrangement, it will be seen that the DOP may be selectively dispersed into any one of the four channels of each filter bank by selectively rotating the dials 52 from the outside of the housing. In particular, each dial 52 may be rotated to a first position (shown in FIG. 5) wherein the inner valve member 46 blocks passage of the DOP into both of the assemblies 56, a second position wherein the DOP enters one of the dispersion tubes 58, and a third position wherein the DOP enters the other of the dispersion tubes 58. Where a large number of filters are disposed in each horizontal row of the bank, it may be necessary to employ a second inner valve member (not shown) which enters the outer tubular member 45 from the opposite side of the housing, to control entry of the DOP into the dispersion assemblies adjacent the side wall 15.

The dispersing means of the illustrated embodiment of the present invention further includes means for imparting a like electrical charge to the particles upon exiting through the openings in the dispersion tubes 58. The charged particles thus repel each other, which results in their rapid dispersion within the airstream. This in turn permits the dispersion tubes to be mounted relatively close to the front face of the filter to thereby minimize the space requirements of the housing 12, while also achieving a substantially uniform dispersion of the particles across the entire front face of the filter which is necessary to assure accurate test results.

Figure 6:
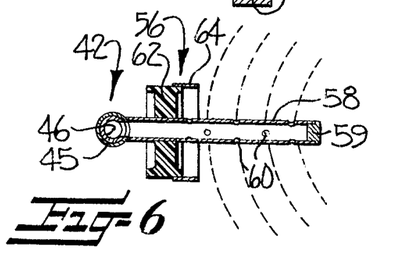
FIG. 6 is a sectional side view of one of the dispersion assemblies of the present invention, with the ring being shown in its withdrawn position.
Figure 7:
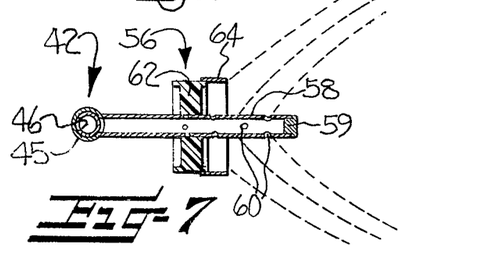
FIG. 7 is a view similar to FIG. 6 but showing the ring in its forward position.
Figure 8:
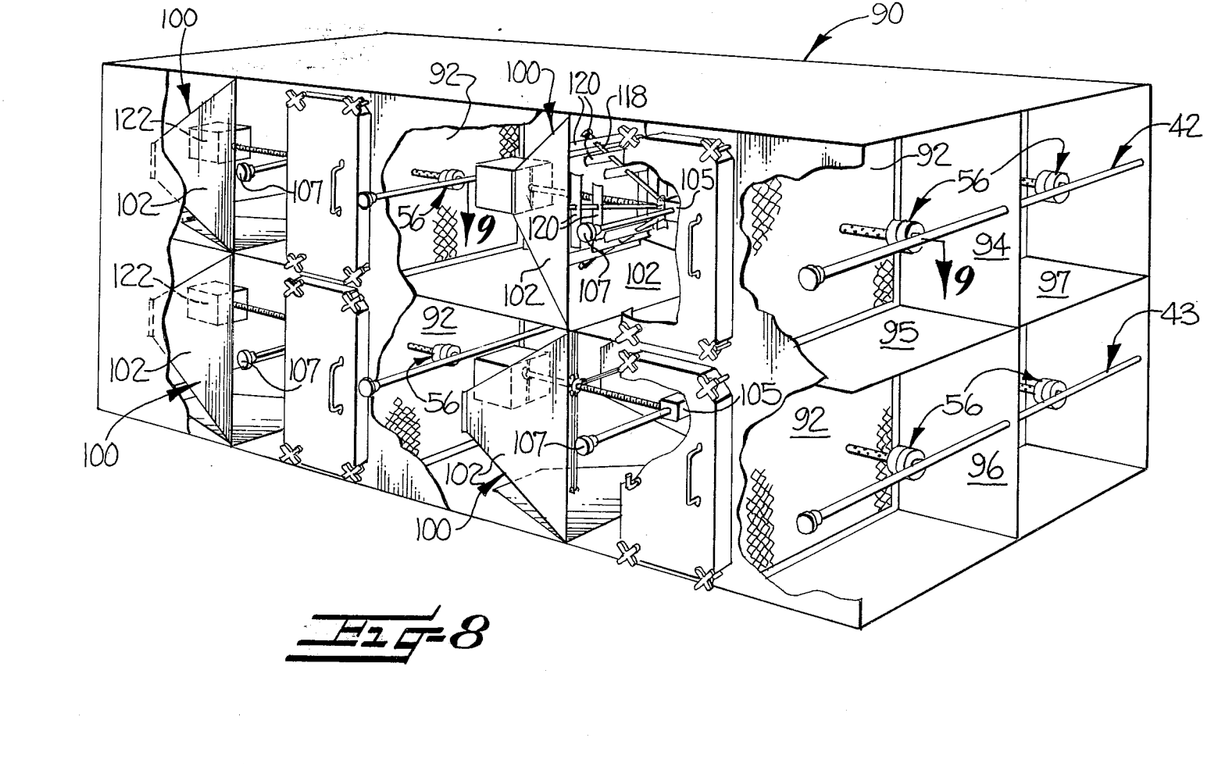
FIG. 8 is a perspective view, partly broken away, of another embodiment of a filter test housing which embodies the present invention.
Figure 9:
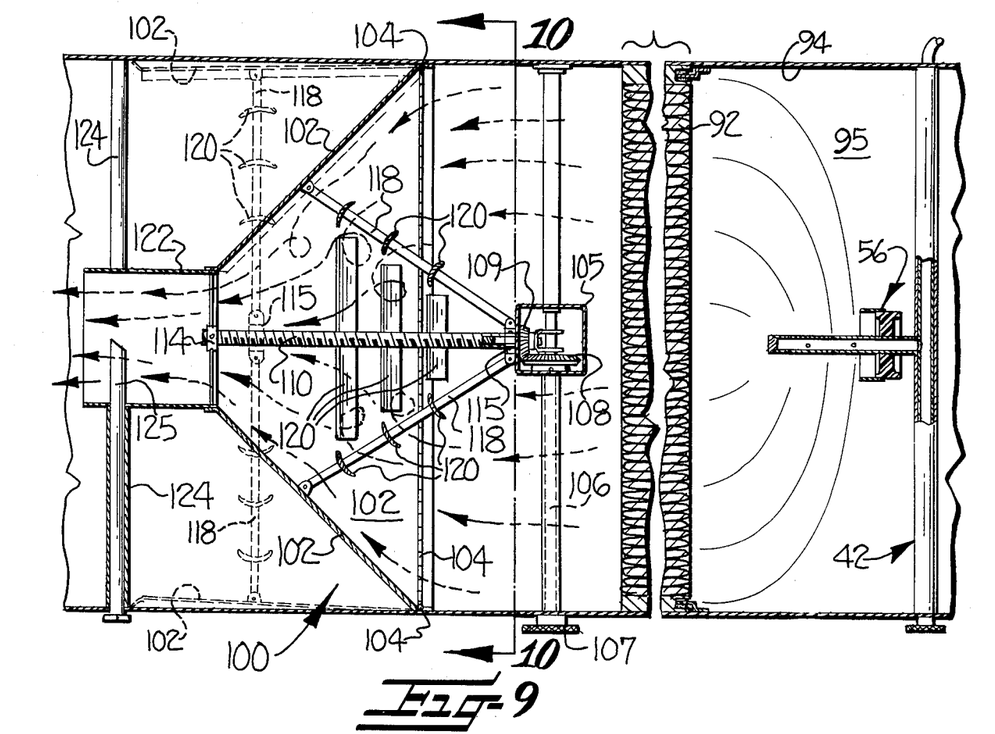
FIG. 9 is a sectional plan view taken substantially along the line 9—9 of FIG. 8.
Figure 10:
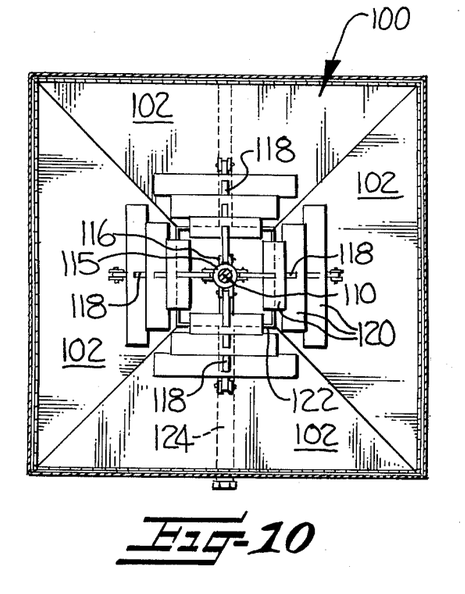
FIG. 10 is a transverse sectional view taken substantially along the line 10—10 of FIG. 9, and illustrating the collapsible panel structure in its closed or operative position.
Figure 11:
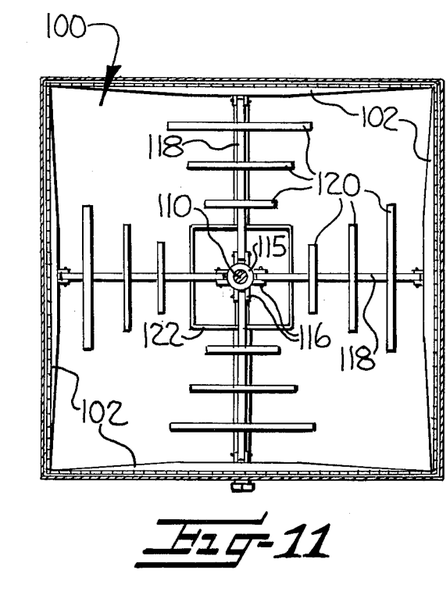
FIG. 11 is a view similar to FIG. 10 but illustrating the collapsible panel structure in its open or non-operative position.

As illustrated, the means for imparting the electrical charge to the particles comprises a cylindrical non-conductive plastic support 62 slideably carried on the dispersion tube 58. Four slots 63 extend axially through the support, and a circular metal ring 64 is fixedly mounted on the plastic support. Thus the metal ring 64 is coaxially disposed about and radially spaced from the dispersion tube, and the support 62 and ring 64 may be axially moved along the tube 58 as indicated in FIGS. 6 and 7. The ring 64 is connected to the electrostatic generator 66 via one of the lines 67, such that an electrical charge from the generator is imparted to the ring upon the closing of the associated switch 68.

In order to permit a determination as to whether any of the particles are leaking through or bypassing around the filter, a fenestrated metal collecting surface in the form of a plate 70 is mounted within the housing 12 and immediately downstream of each filter 30. More particularly, each plate 70 is disposed substantially parallel to the downstream face of the filter and is substantially coextensive in area therewith. Also, each plate is electrically insulated from the housing by means of a surrounding plastic strip 71 or the like, and each plate is able to be selectively connected to a suitable testing instrument 72 through one of the lines 73 and switches 74. In order that the plates 70 not unduly impede the airflow, the surface thereof is provided with myriad, evenly spaced circular openings 75.

The testing instrument 72 preferably includes provision for imparting an electrostatic charge to each plate 70 which is of a polarity opposite from the charge imparted to the DOP particles to thereby attract the particles to the surface of the plate. Also, the testing instrument includes an ammeter 77 for measuring the current passing from the particles which may have leaked through or around the associated filter and come in contact with the plate 70. Thus the reading of the ammeter 77 provides a means for determining whether a leak exists and the extent thereof.

Means are also provided in the illustrated housing 12 for measuring the concentration of the particles at a plurality of spaced locations immediately upstream of each filter 30 to thereby permit a determination of the uniformity of concentration of the particles over the entire front face of the filter. As illustrated, the concentration measuring means comprises an open work supporting grid 80 formed of woven strands or the like, and which extend transversely across each chamber. The strands are formed of an electrical insulating material, such as plastic or glass, and a number of relatively small collecting plates 82 are mounted on the grid at spaced locations. The plates thus are positioned parallel to the front face of the associated filter, and each plate 82 is individually connected to the testing instrument 72 through the lines 84 and switches 85, whereby the electrical charge imparted to each of the plates 82 by the DOP particles contacting the same may be measured by the ammeter 77 to permit a determination of the uniformity of distribution of the DOP over the entire front face of the filter. Also, if desired, an electrical charge may be imparted to each plate to attract the DOP particles thereto.

FIGS. 6 and 7 demonstrate the manner in which the dispersion assembly 56 of the present invention may be adjusted to provide varying dispersion patterns. In particular, it has been found that upon sliding the support 62 and ring 64 to a rearward position as shown in FIG. 6, a relatively wide, conical dispersion pattern is achieved. Upon sliding the support and ring to a forward position as shown in FIG. 7, the ring overlies some of the openings 60 and serves to focus the conical dispersion pattern into a more narrow area. By this arrangement, the dispersion apparatus may be readily adapted for filters of different sizes.

In a preferred embodiment of the present invention, the dispersion tube 58 of each dispersion assembly 56 is fabricated from a metal, such as aluminum or stainless steel tubing, and is about 8½ inches in length and about 11/16 inches in diameter. The openings 60 have a diameter of about ⅛ inches, and they are spaced along at least the downstream half of the length of the tube. More particularly, the tube 58 includes a total of eight openings 60 which are substantially uniformly distributed about the cross-sectional circumference of the tube and such that the particles emanate from the tube in substantially all radial directions. The downstream end of the tube is spaced about four inches from the front face of the filter, and about three inches from the grid 80. The metal ring 64 is fabricated from aluminum or any other highly conductive metal, and has a diameter of about 3 and 11/16 inches and an axial length of about 1 and ¼ inches.

The collecting plates 70 are preferably fabricated from aluminum sheeting or other conductive material, such as metallic woven screen, and are preferably positioned not more than about six inches downstream of the adjacent face of the filter. In this regard, the panels 36–39 may extend through the bank and downstream thereof to insure that substantially all of the air passing through the upstream channel and filter passes through the associated collecting plate 70. Also, in the preferred embodiment the total area of the circular openings 75 in each of the plates 70 comprises at least about 30 to 40% of the area of the entire plate. Also, each of the openings 75 has a diameter of about ⅛ inches.

Also as illustrated, a total of nine small upstream collecting plates 82 are mounted on the supporting grid 80, with the plates 82 being evenly spaced in each air channel in the manner shown in FIG. 2. Each plate is about four inches square, and is otherwise of a construction similar to that of the downstream plate 70.

In operation, the air enters the housing 12 from the inlet duct 21, passes sequentially through the two banks of filters 30, and then exits through the outlet duct 24. Typically, the maximum operational airflow rate is about 1400–1500 cfm for each filter 30 of the size and type described above. Upon reaching the panels 36–39 of the initial bank of filters, the airstream is divided into four isolated portions, such that the panels define an individual test chamber upstream of each filter in the initial bank. In the illustrated embodiment, the airstream is also maintained in these four isolated portions between the banks of filters.

To conduct the leakage test, the operational airflow rate is maintained, and the dial 52 of one of the selected pipes 42, 43 is initially rotated to a position wherein the openings 48*a* and 48*b* are aligned, and such that the DOP particles enter the associated dispersion tube 58 and are dispersed into the isolated airstream. In this regard, the DOP is maintained under a positive pressure of about 20 psig within the outer tubular member 45. Also it will be understood that the radial distribution of the openings 60 in the dispersion tube 58 aids in the dispersion of the particles, and that since the particles enter the isolated portion of the airstream somewhat downstream of the leading edge of the panels 36-39, the other isolated portions flowing through the remainder of the bank will remain free of the particles.

Concurrently with the introduction of the DOP, an electrostatic charge on the order of about 60,000 volts is imparted to the associated ring 64, which in turn imparts a like electrical charge to the particles emanating from the dispersion tube to cause them to fully and substantially completely disperse prior to reaching the front face of the associated filter. While the theory by which the particles receive the electrostatic charge is not fully verified, it is believed that the charged ring 64 creates a cylindrically shaped electrostatic field around the tube 58, and that the air molecules passing through the field are ionized by the field. The resulting ions collide with the DOP particles and impart an electrical charge to them.

An opposite electrical charge of relatively small voltage, such as about 6 to 10 volts, is also imparted to the downstream collecting plate 70. In this regard, it has been found preferable that a positive charge be imparted to the ring 64 and thus the DOP, while a netative charge is imparted to the downstream plate 70. The testing equipment 72 is then operatively connected to the downstream collecting plate, such that any electrically charged DOP particles on the downstream side of the filter are detected by measuring the current passing from the particles to the plate as registered by the ammeter 77.

Where it is desired to compare the uniformity of concentration of the DOP particles across the upstream face of the filter, each of the upstream collecting plates 82 is selectively connected to the testing equipment and the current flowing therefrom is measured. If the current from each plate is substantially uniform, it may be assumed that the particles are substantially uniformly dispersed.

Upon completion of the test for the first filter, the dial is rotated to another predetermined position wherein the openings *49a* and *49b* are aligned, and the test is repeated. The procedure is sequentially continued in this manner until each filter in the housing has been individually tested.

As an important advantage of the embodiment of the invention illustrated in FIGS. 1–7, it will be noted that no air samples or other materials are physically withdrawn from the housing for analysis. Thus where harmful or dangerous materials may be present in the airstream, there is no danger that such materials may contaminate exterior instruments, or be released to the atmosphere.

FIGS. 8–11 illustrate an alternative embodiment of the present invention, and which includes a housing 90 sealably mounting two banks of filters in series, with each bank comprising four filters 92 in parallel. As in the above embodiment, four panels 94, 95, 96, 97 divide the housing into four isolated chambers, and a pair of double walled supply pipes 42, 43 extend horizontally across the two rows of filters, with the supply pipes mounting a dispersion assembly 56 immediately upstream of each filter.

A downstream leak detecting apparatus 100 is mounted immediately downstream of each filter for selectively condensing and imparting turbulence or agitation to the airstream, and for withdrawing a sample from the condensed and turbulent airstream to permit external analysis of the same in the conventional manner. More particularly, the apparatus 100 includes a collapsible panel system which comprises four panels 102 of isosceles trapezoidal outline positioned within each chamber of the housing, with each panel being mounted to overlie one wall of the chamber. The longest edge of each panel corresponds to the width of the associated side wall, i.e., about 24 inches in a typical installation, and is pivotally connected to such wall by a suitable hinge 104. The hinged edges are positioned in a common transverse plane within the housing as best seen in FIG. 9.

The panels 102 are each selectively pivotable between a non-operative position wherein the panels are disposed immediately adjacent the side walls of the housing as seen in dashed lines in FIG. 9, and an operative position wherein the panels are inclined at an angle of about 45° with respect to the direction of the airstream and collectively define a truncated four sided pyramid having an open downstream end as seen in solid lines in FIG. 9. In this regard, the angled side edges of the panels are designed to contact each other in the operative position thereof to form a funnel-like arrangement for directing the airstream through the open end, which is typically about 6 inches square.

Means accessible from the exterior of the housing are provided for selectively pivoting the four panels 102 in unison between their operative and non-operative positions. In the illustrated embodiment, this pivoting means comprises a tubular support member 104 fixedly mounted within each chamber and extending horizontally across the downstream face of the associated filter. The support member mounts a gear box 105 centrally in the chamber, and a rod 106 extends coaxially through the support member so as to be rotatable therein. The rod 106 extends through one side wall of the housing and mounts an external hand wheel 107, and the rod further carries a bevel gear 108 within the box 105 and which is positioned for operative engagement with the mating gear 109. The mating gear 109 is in turn fixedly carried by an externally threaded rod 110 which extends centrally along the chamber in the direction of airflow, with the upstream end being rotatably supported by a bracket 112 on the rod 106, and the downstream end being rotatably supported by a bracket 114 as hereinafter further described.

A transition nut 115 is threadedly carried by the rod 110. In order to prevent the nut from rotating, it may be provided with a longitudinal aperture which slideably receives a fixed wire rod (not shown) which extends between the bracket 114 and gear box 105. The nut 115 further includes four channel shaped brackets 116 equally spaced about the periphery thereof, and a strut 118 is pivotally connected to each bracket and extends to one of the four panels 102, to which the strut is also pivotally attached. By this arrangement, rotation of the hand wheel 107 serves to rotate the mating gears 108, 109, and the rod 110, causing the non-rotating nut 115 to axially move along the rod 110 to pivot the panels 102 between their operative and non-operative positions. Also, each strut 118 carries a plurality of vanes 120 spaced along the length thereof for the purposes set forth below.

An open box 122 of rectangular cross-sectional configuration is disposed centrally within each chamber, with the upstream end of the box being configured and positioned to mate with the downstream side edges of the panels 102 when disposed in their operative position, note FIG. 9. The box 122 is mounted in this position by means of a number of tubular supports 124 which extend to the side walls of the channel, and the upstream end of the box mounts the supporting bracket 114 as described above. One of the tubular supports 124 mounts a sample tube 125 therein which extends into the box and has an open end 126 facing upstream, i.e., in the direction of the filter, and aligned with the open downstream end of the pyramid formed by the panels in their operative position. The tube 125 extends outwardly through the side wall and mounts a cap 126 on the exterior of the housing for temporarily closing the same during periods of normal, non-testing operation of the housing.

The panels 102 of the test apparatus are normally maintained in their non-operative position wherein the panels are disposed adjacent the side walls and the vanes 120 are aligned with the direction of the airstream so that neither the panels 102 or vanes 120 significantly obstruct the normal air flow. When it is desired to test the associated filter, the panels 102 are translated to their operative position by manually turning the hand crank 107, and the associated dispersing apparatus 56 is activated in the manner described above the disperse the DOP into the airstream. With the panels in their operative position, the air passing through the filter 92 is condensed or funneled into the box 122, and since the vanes 120 are then angularly disposed with respect to the direction of airflow, a certain degree of turbulence or agitation is imparted to the air. Thus the air and any leaking DOP is thoroughly mixed by the time it passes through the box, such that the sampling tube 125 will be assured of picking up a representative portion of the DOP. By this arrangement, the sampling tube 125 may be mounted at a point relatively close to the downstream side of the filter 92 to thereby minimize the space requirements of the apparatus, while being assured that a representative sample of any leaking DOP will be received in the tube 125 and thus detected.

Where it is desired to particularly locate a leak in a filter, it has been found that when the airstream is maintained under substantially laminar flow conditions as it is funneled by the panels 102 and passes through the box 122, the air passing through the box is representative in cross-section of the air passing through the filter. In other words, any DOP leaking through a particular point in the filter will appear at the corresponding point in the cross-sectional area of the box. Thus by manually scanning the full area of the box, the location of the leak in the filter can be identified. In order to achieve the necessary degree of laminar flow for this purpose, the vanes 102 would be eliminated, and the other structural members in the duct may be streamlined to the extent possible. The option of either turbulent or laminar flow may also be desirable in certain instances, and in such event, a movable butterfly type baffle (not shown) may be mounted at the upstream end of the box as an alternative to the vanes 120 and such that the baffle may be selectively moved between a closed position which substantially maintains laminar flow and an open or transverse position wherein the airstream is agitated.

While the collapsible leak detection apparatus 100 has been illustrated separately from the embodiment showing the electrical collecting plate 70, it should be understood that in certain instances it may be desirable to incorporate both systems in the housing to permit a selective use of the systems or a verification of the results. Also, while in the illustrated embodiment, a separate dispersing apparatus and downstream detection apparatus is employed for each filter in the bank, it will be appreciated that in certain less critical installations, it may be sufficient to employ a single dispersing apparatus and a single detection apparatus for more than one filter in the bank.

In the drawings and specification, there has been set forth a preferred embodiment of the invention, and although specific terms are employed, they are used in a generic and descriptive sense only and not for purposes of limitation.

That which is claimed is:

1. A method for testing for leakage of particles of predetermined size through or around an air filter which is sealably mounted within a housing, and characterized by the ability to substantially uniformly disperse the particles across the entire area of the upstream face of the filter from a point relatively close to the filter, and comprising the steps of passing an airstream through the housing and filter, distributing particles of predetermined size into the airstream within the housing and upstream of the filter, and while imparting a like electrical charge to the particles such that the particles repel each other and substantially uniformly disperse within the airstream, and while monitoring the airstream on the downstream side of the filter to detect at least a portion of any particles in the airstream and thereby permit a determination as to whether any of the particles are leaking through or around the filter.

2. The method as defined in claim 1 wherein the step of monitoring the airstream includes collecting electrically charged particles on a collecting surface on the downstream side of the filter and measuring the current passing from the particles to the collecting surface to thereby permit a determination of the extent of the leakage.

3. The method as defined in claim 2 wherein a positive electrical charge is imparted to the particles, and the step of collecting the electrically charged particles includes imparting a negative electrical charge to the downstream collecting surface to attract the particles thereto.

4. The method as defined in claim 1 comprising the further step of comparing the concentration of the particles at a plurality of spaced locations immediately upstream of the filter to permit a determination of the uniformity of distribution of the particles over the entire face of the filter.

5. The method as defined in claim 4 wherein the step of comparing the concentration of the particles includes collecting the electrically charged particles on a plurality of spaced apart collecting surfaces positioned within the housing and upstream of the filter, and measuring the current passing from the particles to each of the collecting surfaces.

6. The method as defined in claim 1 wherein the step of monitoring the airstream includes condensing the airstream immediately downstream of the filter, withdrawing a sample from the condensed airstream, and analyzing the withdrawn sample to detect at least a portion of any particles therein.

7. The method as defined in claim 6 wherein the step of condensing the airstream includes imparting turbulence thereto.

8. A method for testing for leakage of particles of predetermined size through a bank of filters installed in a parallel arrangement in a housing and which is characterized by the ability to individually test the filters in the bank and thereby permit the immediate identification of a leaking filter in the bank, and comprising the steps of passing an airstream concurrently through all of the filters in the bank, while dividing the airstream into isolated portions immediately upstream of each filter such that each isolated portion of the airstream passes through a single filter, sequentially distributing particles of predetermined size within each isolated portion of the airstream and immediately upstream of each filter while dispersing the particles to achieve a substantially uniform concentration thereof across the face of the filter, and while maintaining the other isolated portions free of the particles, and monitoring the airstream downstream of the bank of filters to detect at least a portion of any particles in the airstream, such that a determination may be made as to which if any of the filters in the bank is leaking.

9. A method as defined in claim 8 wherein the particles are distributed into each of the isolated portions of the airstream from a location centrally positioned with respect to the upstream face of the associated filter.

10. A method as defined in claim 9 wherein the step of dispersing the particles includes imparting a like electrical charge to the particles to cause the same to repel each other.

11. The method as defined in claim 8 comprising the further step of condensing each isolated portion of the airstream immediately downstream of the associated filter while imparting turbulence thereto in a sequence corresponding to the sequence for distributing the particles within the isolated portions of the airstream, and wherein the step of monitoring the airstream includes withdrawing a sample of the condensed, turbulent airstream and analyzing the withdrawn sample to detect at least a portion of any particles therein.

12. A method for testing for leakage of particles of predetermined size through an air filter, and comprising the steps of distributing particles of predetermined size on one side of the filter while imparting a like electrical charge to the particles, and while monitoring for the presence of any such particles on the opposite side of the filter and including collecting at least a portion of the electrically charged particles on a collecting surface and detecting the current passing from the particles to the collecting surface.

13. The method as defined in claim 12 wherein the step of monitoring for the presence of the particles further includes imparting an opposite electrical charge to the collecting surface to attract the particles thereto.

14. The method as defined in claim 13 wherein the particles have a mean diameter of between about 0.3 to 0.7 microns.

15. An apparatus for filtering an airstream and having provision for testing for leakage of particles of predetermined size through or around the filter, and characterized by the ability to substantially uniformly disperse the particles across the entire area of the upstream face of the filter from a point relatively close to the filter to thereby minimize the space requirements of the apparatus, and comprising a housing adapted to form a part of an air duct system having an airstream passing therethrough, means for sealably mounting a filter within the housing such that the airstream passing through the housing passes through the filter, means for introducing particles of predetermined size into the airstream within the housing and immediately upstream of the filter, and including means for imparting a like electrical charge to the particles such that the particles repel each other and rapidly disperse within the airstream, and means for detecting at least a portion of any particles further downstream of the filter to thereby permit a determination as to whether any of the particles are leaking through or around the filter.

16. The apparatus as defined in claim 15 wherein said means for introducing particles into the airstream comprises an elongate tubular member mounted within said housing at a central position with respect to the upstream face of the filter and being disposed in a direction substantially parallel to the direction of airflow through the housing, said tubular member having a plurality of openings extending radially through the wall thereof, and means for introducing the particles into the upstream end of the tubular member such that the particles exit through the radial openings into the airstream.

17. The apparatus as defined in claim 16 wherein said means for imparting a like electrical charge to the particles comprises a circular metal ring coaxially disposed about said tubular member, and means for imparting an electrostatic charge to the ring such that the particles exiting through the openings of said tubular member receive an electrical charge.

18. The apparatus as defined in claim 15 wherein said means for detecting the particles comprises a fenestrated metal collecting plate positioned within the housing and downstream of the filter, and means for imparting an electrical charge to said plate which is of a polarity opposite from the charge imparted to said metal ring.

19. The apparatus as defined in claim 18 wherein said collecting plate is disposed substantially parallel to the downstream face of said filter and is substantially coextensive in area therewith.

20. The apparatus as defined in claim 19 wherein at least about 30% of the area of said collecting plate is open.

21. The apparatus as defined in claim 15 wherein said detecting means comprises means for condensing the airstream immediately downstream of the filter, and means for withdrawing a sample of the condensed airstream to permit an analysis of the same.

22. The apparatus as defined in claim 15 further comprising means for measuring the concentration of the particles at a plurality of spaced locations immediately upstream of the filter to thereby permit a determination of the uniformity of the distribution of the particles over the entire front face of the filter.

23. The apparatus as defined in claim 22 wherein said means for measuring the concentration of the particles comprises a plurality of relatively small collecting plates mounted within said housing and immediately upstream of the filter, and means for selectively measuring the charge imparted to each of said upstream collecting plates by the particles.

24. An apparatus for filtering an airstream through a bank of filters and having provision for testing for leakage of particles of predetermined size through or around any of the filters and characterized by the ability to permit the immediate identification of a leaking filter in the bank, and comprising
- a housing adapted to form a part of an air duct system having an airstream passing therethrough,
- means for sealably mounting a bank of filters in a parallel arrangement in said housing such that the airstream passing through the housing passes through the bank of filters,
- panel means mounted within said housing and immediately upstream of the bank of filters for dividing the housing into a separate air channel for each of the filters, and such that the airstream is divided into an isolated portion within each of the separate channels which passes through a single filter,
- means including an outlet nozzle mounted centrally within each of said separate channels for selectively dispersing particles of predetermined size into the portion of the airstream passing through any one of the channels, and
- means mounted within said housing and downstream of said filter bank for collecting at least a portion of any particles in the airstream to thereby permit a determination as to whether any of the particles are leaking through or around any of the filters in the filter bank.

25. The apparatus as defined in claim 24 wherein said outlet nozzle comprises an elongate tubular member disposed in a direction substantially parallel to the direction of airflow passing through the associated channel, said tubular member having a plurality of openings extending through the wall thereof in a number of different radial directions, whereby the particles are introduced into the airstream in a plurality of radial directions.

26. The apparatus as defined in claim 24 wherein said collecting means comprises means positioned immediately downstream of each filter for selectively condensing and imparting turbulence to the airstream, and means for withdrawing a sample of the condensed and turbulent airstream to permit an analysis of the same.

27. An apparatus for rapidly and substantially uniformly dispersing particles of predetermined size into a moving airstream, and comprising
- an elongate tubular member adapted to be disposed in a direction parallel to the direction of the airstream, said tubular member having a plurality of openings extending radially through the wall thereof, and with the openings extending in a plurality of radial directions,
- a circular metal ring,
- means for mounting said ring in a coaxially disposed, radially spaced apart relationship about said tubular member,
- means for introducing the particles into the tubular member such that the particles exit through the radial openings into the airstream, and
- means for imparting an electrostatic charge to said ring such that the particles exiting through the openings of the tubular member receive an electrical charge of like polarity and the particles repel each other and rapidly disperse within the airstream.

28. The apparatus as defined in claim 27 wherein said openings are substantially uniformly distributed about the cross-sectional circumference of the tubular member, such that the particles exit from the tubular member in substantially all radial directions.

29. The apparatus as defined in claim 28 wherein said mounting means includes a non-conductive support slideably mounted upon said tubular member and interconnecting said ring and tubular member, and such that the ring may be axially moved along the tubular member to thereby selectively change the dispersion pattern of the particles in the air-stream.

30. An apparatus for testing for leakage of particles of predetermined size through or around an air filter, and characterized by minimum space requirements, and comprising
- a housing of rectangular cross-sectional configuration and having four side walls,
- means for sealably mounting a filter within the housing such that an airstream passing through the housing passes through the filter,
- means for introducing particles of predetermined size into the airstream within the housing and immediately upstream of the filter,
- means for selectively condensing the airstream immediately downstream of the filter, and
- means for withdrawing a sample of the condensed airstream to permit an analysis of the same and thereby determine whether any of the particles are leaking through or around the filter.

31. The apparatus as defined in claim 30 wherein said means for selectively condensing the airstream comprises
- four panels of isosceles trapizoidal outline, with the longest edge of each panel corresponding in length to the width of an associated side wall of the housing,
- means for pivotally mounting the longest edge of each panel to its associated side wall along a common transverse plane within the housing, and such that the panels are pivotal between a non-operative position wherein each panel is disposed immediately adjacent its associated side wall and an operative position wherein the panels collectively define a truncated four sided pyramid having an open downstream end, and
- means for selectively pivoting the four panels between their non-operative and operative positions.

32. The apparatus as defined in claim 31 wherein said means for selectively pivoting the four panels comprises a threaded rod rotatably mounted within said housing, means for selectively rotating said rod, a nut threadedly carried by said rod, and a strut pivotally connected between each of said panels and said nut, whereby rotation of said rod causes the nut to move axially along the rod to pivot the panels.

33. The apparatus as defined in claim 32 wherein said means for condensing the airstream further comprises a plurality of vanes carried by said struts such that the vanes are substantially aligned with the airstream when the panels are in their non-operative position, and the vanes are angularly disposed with respect to the airstream when the panels are in their operative position to thereby impart turbulence to the airstream.

34. The apparatus as defined in claim 33 wherein said sample withdrawing means comprises a tubular member having an open forward end aligned with the open downstream end of said pyramid.

* * * * *

UNITED STATES PATENT OFFICE
CERTIFICATE OF CORRECTION

Patent No. 4,055,075　　　　　　　　　　Dated October 25, 1977

Inventor(s) Thomas T. Allan et al.

It is certified that error appears in the above-identified patent and that said Letters Patent are hereby corrected as shown below:

Column 14, line 11, delete "further".

Signed and Sealed this

Sixteenth Day of May 1978

[SEAL]

Attest:

RUTH C. MASON
Attesting Officer

LUTRELLE F. PARKER
Acting Commissioner of Patents and Trademarks